(12) United States Patent
Wang

(10) Patent No.: US 11,565,764 B2
(45) Date of Patent: Jan. 31, 2023

(54) MANUAL FOLDING TELESCOPIC ELECTRIC SCOOTER

(71) Applicant: NANJING JIN BAI HE MEDICAL APPARATUS CO. LTD, Nanjing (CN)

(72) Inventor: Zhaowei Wang, Nanjing (CN)

(73) Assignee: NANJING JIN BAI HE MEDICAL APPARATUS CO. LTD, Nanjing (CN)

( * ) Notice: Subject to any disclaimer, the term of this patent is extended or adjusted under 35 U.S.C. 154(b) by 310 days.

(21) Appl. No.: 16/827,394

(22) Filed: Mar. 23, 2020

(65) Prior Publication Data

US 2021/0053647 A1 Feb. 25, 2021

(30) Foreign Application Priority Data

Aug. 20, 2019 (CN) .......................... 201910768558.7

(51) Int. Cl.
*B62K 15/00* (2006.01)
*B62K 5/007* (2013.01)

(52) U.S. Cl.
CPC .............. *B62K 15/00* (2013.01); *B62K 5/007* (2013.01); *B62K 2201/00* (2013.01); *B62K 2202/00* (2013.01)

(58) Field of Classification Search
CPC .... B62K 15/00; B62K 5/007; B62K 2201/00; B62K 2202/00; B62K 15/008
See application file for complete search history.

(56) References Cited

U.S. PATENT DOCUMENTS

| 2008/0309046 A1* | 12/2008 | Wang ..................... B62K 5/007 280/287 |
| 2012/0193159 A1* | 8/2012 | Wu ........................ B62K 21/12 211/27 |

(Continued)

FOREIGN PATENT DOCUMENTS

| CN | 207809644 U | * | 9/2018 | ............. B62K 15/00 |
| CN | 209617358 U | * | 11/2019 | |

(Continued)

*Primary Examiner* — Darlene P Condra
(74) *Attorney, Agent, or Firm* — Hauptman Ham, LLP

(57) ABSTRACT

The invention discloses a manual folding telescopic electric scooter, which belongs to the technical field of medical equipment, and includes a front axle assembly, a slide rail fixing plate, a slide fixing plate and a rear frame which are sequentially connected. After the matching, the slide rail fixing plate slides inside the slider fixing plate to complete the expansion and contraction; a fixed seat is symmetrically arranged on the rear frame, and the fixed seat is respectively connected to the seat support seat through the corresponding rotating plate. After cooperation, the seat supporting frame is fixed and fold by locking or unlocking the rotating plate. The invention has a lightweight body, which can be easily folded and retracted, and the volume is small after being folded and retracted. The manual folding telescopic electric scooter adopts electromagnetic automatic braking. The overall simple design is convenient and practical. It can easily complete the folding and retracting operation when traveling. The best travel tool for traveling alone, the entire device has a simple and compact structure and has good practicability.

8 Claims, 5 Drawing Sheets

(56) References Cited

U.S. PATENT DOCUMENTS

| | | | | |
|---|---|---|---|---|
| 2012/0193886 A1* | 8/2012 | Wu | ............................ | B60G 9/02 |
| | | | | 280/124.111 |
| 2012/0193891 A1* | 8/2012 | Wu | ........................ | B62K 5/007 |
| | | | | 292/334 |
| 2012/0256386 A1* | 10/2012 | Benarrouch | ............ | B62K 3/002 |
| | | | | 280/87.05 |
| 2012/0292882 A1* | 11/2012 | Ghisolfi | ................. | B62K 3/002 |
| | | | | 280/287 |
| 2014/0203538 A1* | 7/2014 | Huang | .................... | A47C 1/126 |
| | | | | 280/639 |
| 2019/0283831 A1* | 9/2019 | Zhang | ........................ | B62J 1/28 |
| 2020/0207437 A1* | 7/2020 | Chiu | ....................... | B62K 15/00 |

FOREIGN PATENT DOCUMENTS

| | | | | |
|---|---|---|---|---|
| CN | 111017095 A | * | 4/2020 | |
| JP | 3130485 B2 | * | 1/2001 | |

* cited by examiner

MANUAL FOLDING TELESCOPIC ELECTRIC SCOOTER

TECHNICAL FIELD

The invention belongs to the technical field of medical equipment, and particularly relates to a manual folding telescopic electric scooter.

BACKGROUND TECHNIQUE

Electric scooters are mainly used for electric-powered scooters. They are vehicles and auxiliary tools for the purpose of mobility. They can be folded without disassembling the battery, which is convenient to carry and store.

At present, electric wheelchairs on the market are bulky and cannot be folded and stored. They take up special space when placed, and they cannot carry electric wheelchairs for transportation, which is very inconvenient for users.

SUMMARY OF THE INVENTION

Object of the invention: The object of the present invention is to provide a manual folding telescopic electric scooter. The device has a simple and compact structure, realizes easy folding without burden, and is convenient to carry.

Technical solution: In order to achieve the above-mentioned object of the invention, the present invention adopts the following technical solution:

The manual folding telescopic electric scooter includes a front axle assembly, a slide rail fixing plate, a slider fixing plate, and a rear frame that are sequentially connected. After the cooperation, the slide rail fixing plate slides inside the slider fixing plate to complete the telescopic movement; A fixed seat is symmetrically arranged on the rear frame, and the fixed seat is respectively connected with the seat support base through the corresponding rotating plate. After cooperation, the seat supporting frame is fixed and folded by locking or unlocking the rotating plate.

Further, a parallel slide rail is provided on the slide rail fixing plate, and the slider is symmetrically arranged in the slide fixing plate. After cooperation, the slide rail slides back and forth on the slide to complete the fixing of the slide rail fixing plate on the slide. A spring limit pin is provided on the slider fixing plate to perform the limit function.

Further, the rotating plate includes a rotating outer plate and a rotating inner plate which are arranged in a superposed manner; two ends of the rotating outer plate are rotatably fixed on the seat support base and the fixing seat through a fourth rotation shaft and a second rotation shaft, respectively. The two ends of the rotating inner plate are rotatably fixed on the seat support seat and the fixing seat through a third rotation shaft and a first rotation shaft, respectively. The first rotating shaft, the second rotating shaft, the third rotating shaft, and the fourth rotating shaft constitute a parallelogram rotation structure, and the parallelogram rotation structure is locked or unlocked by a limit shaft.

Further, a limiting groove is symmetrically arranged on a side plate of the seat support base, and the limiting axis inserted into the limiting groove, the rotating outer plate is provided with an outer plate clamping groove for clamping or releasing the limiting shaft. The limit shaft moves back and forth in the limiting groove to achieve locking or unlocking; when the limit shaft is locked, the outer board clamping slot at this time catches the limiting shaft; when the limiting shaft is unlocked, the outer plate clamping slot releases the limiting shaft at this time, and the parallelogram rotation structure forms a linkage through the bolt connection.

Further, a hook spring fixing post is symmetrically arranged on a side plate of the seat support base, and the hook spring fixing post fixes one end of the hook spring, and the other end of the hook spring penetrates into the limiting shaft.

Further, the seat support frame further includes a seat support tube which is symmetrically arranged, and the seat support base are connected by the seat support tube.

Further, the slider fixing plate is fixed to the rear frame through a fastening plate; A motor is provided on the rear frame.

Further, both sides of the front axle assembly are provided with cooperative front wheels and front mud tile; rear wheels are arranged symmetrically on both sides of the rear frame; front vertical shafts are set above the front axle assembly, and set the recliner and direction handle on the front vertical shaft in this order.

Further, the angle adjuster comprises an adjusting knob, a lower adjuster, and an upper adjuster, adjusting nut; the lower adjuster meshes with the upper adjuster through a tooth-shaped protrusion, and the adjusting knob and the adjusting nut are screwed tightly through a thread fit. After the cooperation, the gap between the lower adjuster and the upper adjuster is controlled by turning the adjustment knob clockwise or counterclockwise. When the adjustment knob is rotated counterclockwise, the upper adjuster is realized free rotation, so as to adjust the angle of direction handle. The angle of the direction handle can be freely adjusted according to the different needs of the driver, thereby achieving the comfort of the driver.

Beneficial effect: Compared with the prior art, the manual folding telescopic electric scooter of the present invention has a lightweight body, which can be easily folded and retracted, and the volume is small after being folded and retracted. The manual folding telescopic electric scooter adopts electromagnetic automatic braking. The overall simple design is convenient and practical. It can easily complete the folding and retracting operation when traveling. The best travel tool for traveling alone, the entire device has a simple and compact structure and has good practicability.

DETAILED DESCRIPTION

Figure 1:
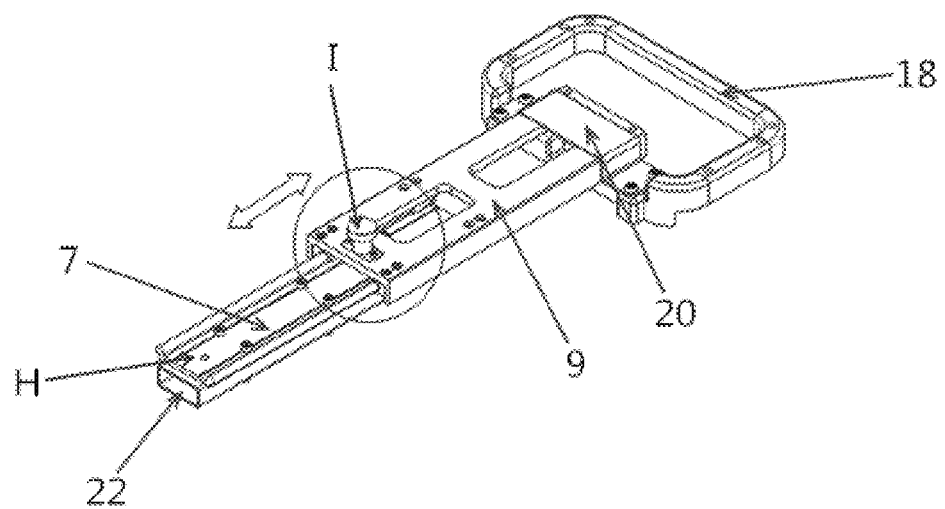
FIG. 1 is a schematic diagram of a manual telescopic structure.

The invention is further described below with reference to the drawings and specific embodiments.

As shown in FIG. 1-10, the reference numerals are as follows: front axle assembly 1, front vertical shaft 2, front wheel 3, front mud tile 4, recliner 5, direction handle 6, slide rail 7, spring limit pin 8, slider fixing plate 9, seat support tube 10, seat support base 11, hook spring 12, rotating inner plate 13, limiting shaft 14, rotating outer plate 15, fixed seat 16, rear wheel 17, rear frame 18, motor 19, fastening plate 20, slider 21, slide rail fixing plate 22, first rotating shaft 23, second rotating shaft 24, third rotating shaft 25, fourth rotating shaft 26, locking rotating shaft 27, unlocking rotating shaft 28, hook spring fixing column 29, outer plate card slot 30 and limiting slot 31.

Figure 2:
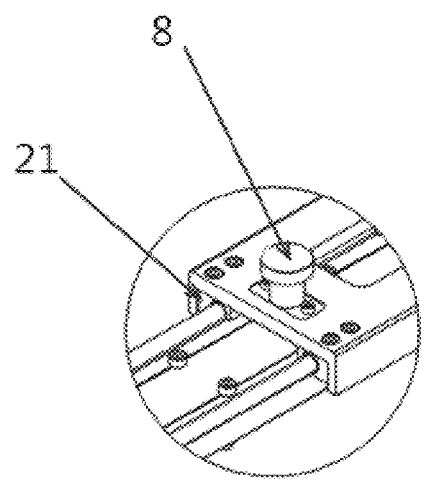
FIG. 2 is a partially enlarged view of FIG. 1.
Figure 3:
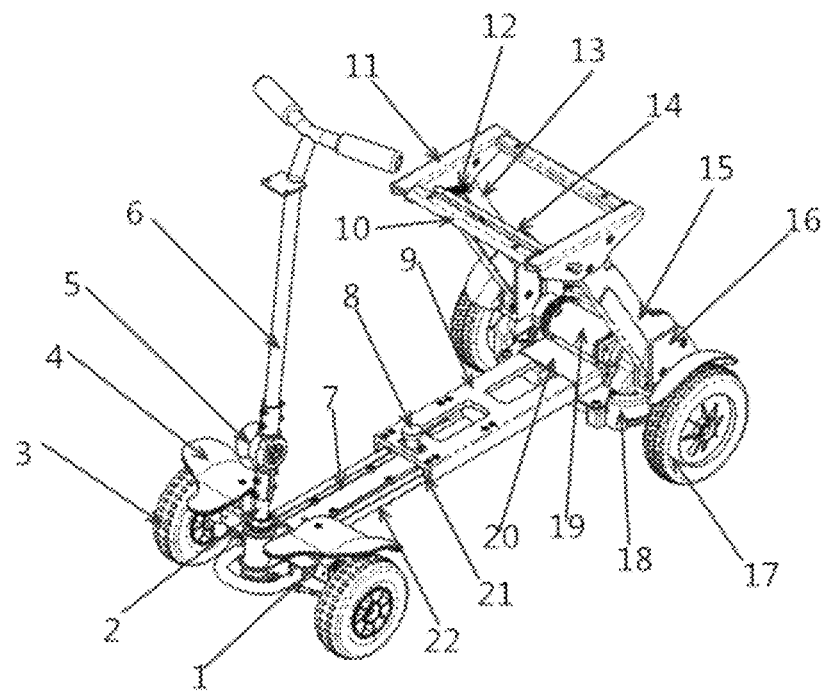
FIG. 3 is a schematic structural diagram of a manual folding telescopic electric scooter.
Figure 4:
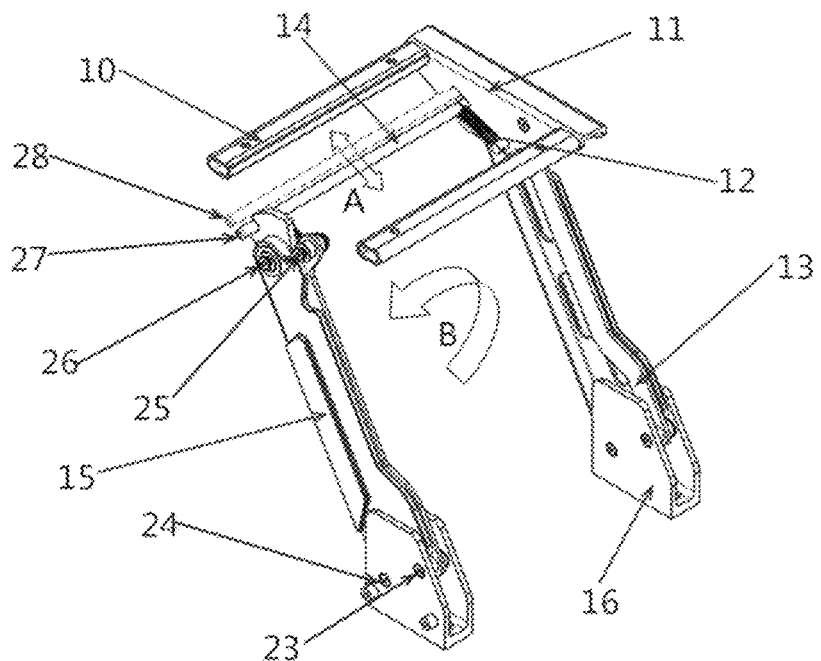
FIG. 4 is a schematic diagram of a folding structure of a seat.

As shown in FIG. 1-3, a manual folding telescopic electric scooter includes a front axle assembly 1, a slide rail fixing plate 22, a slider fixing plate 9, and a rear frame 18, which are sequentially connected. Fixing seats 16 are symmetrically arranged on the rear frame 18, and each fixing seat 16 is respectively connected to the seat support base 11 through a rotation plate on the corresponding side, and the seat support base 11 are connected through the seat support tube 10. The rotating plate includes a rotating outer plate 15 and a rotating inner plate 13 which are arranged in a superposed manner.

On both sides of the front axle assembly 1 are provided with cooperative front wheels 3 and front mud tile 4; rear wheels 17 are arranged symmetrically on both sides of the rear frame 18; front vertical shafts 2 are set above the front axle assembly 1, and set the recliner 5 and direction handle 6 on the front vertical shaft 2 in this order.

A parallel slide rail 7 is provided on the slide rail fixing plate 22, and set the slide block 21 symmetrically in the slider fixing plate 9. After cooperation, the slide rail 7 slides back and forth on the slide block 21 to complete the telescopic action of the slide rail fixing plate 22 in the slide fixing plate 9; A spring limit pin 8 is provided on the slider fixing plate 9 described above to perform the limit function.

The slider fixing plate 9 is fixed to the rear frame 18 by a fastening plate 20. A motor 19 is provided on the rear frame 18.

Figure 7:
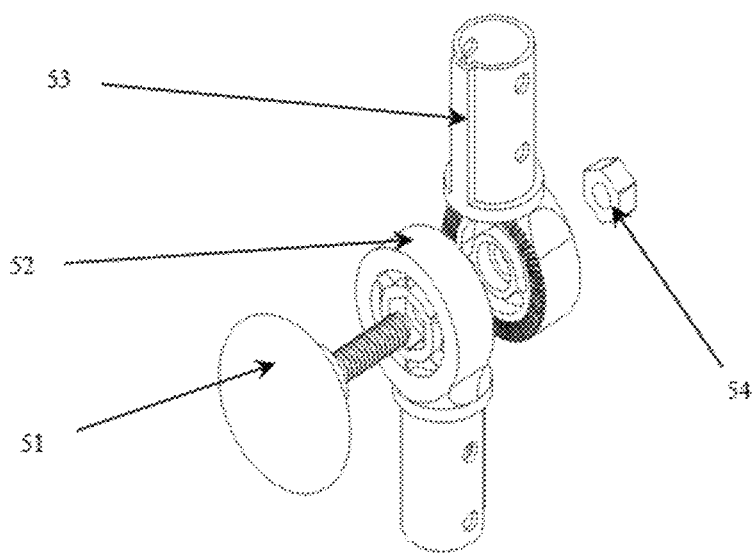
FIG. 7 is a schematic structural diagram of a angle adjuster.

As shown in FIG. 7, it is an exploded view of the components of the angle adjuster 5. The angle adjuster 5 includes an adjusting knob 51, a lower adjuster 52, an upper adjuster 53, and an adjusting nut 54. Among them, the lower regulator 52 and the upper regulator 53 are provided with tooth-shaped protrusions, which cooperate with each other through a gear-like structure. The adjusting knob 51 and the adjusting nut 54 are screwed tightly through a thread fit. The lower regulator 52 is fixed to the front vertical shaft 2 by a standard piece, and the upper regulator 53 is fixed to the direction handle 6 by a standard piece. After the angle adjuster 5 is assembled, the gap between the lower adjuster 52 and the upper adjuster 53 is controlled by turning the adjustment knob 51 clockwise or counterclockwise. When the adjust knob 51 is rotated counterclockwise, the upper adjuster 53 is realized free rotation, so as to adjust the angle of direction handle 6. The angle of the steering wheel 6 can be freely adjusted according to the different needs of the driver, thereby achieving the comfort of the driver.

Figure 8:
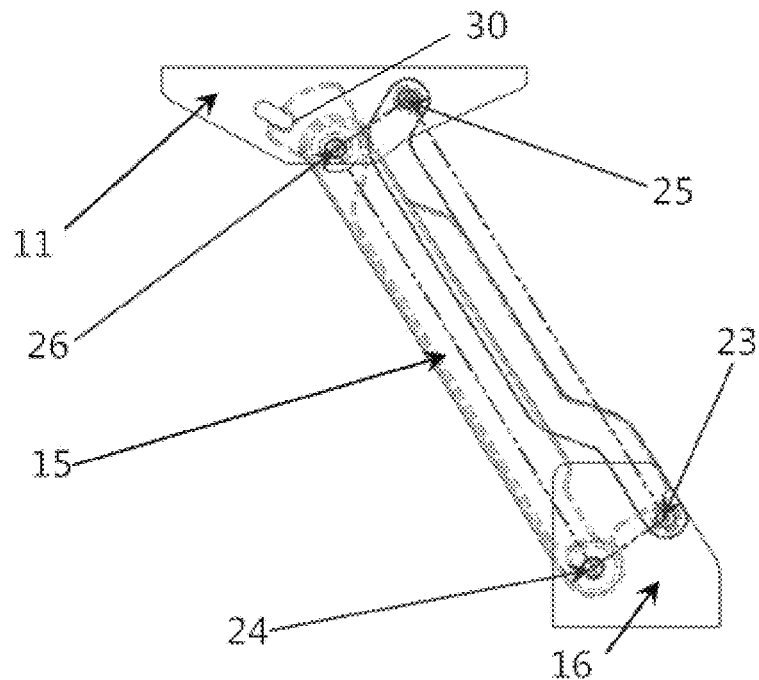
FIG. 8 is a schematic diagram of a parallelogram rotation structure.
Figure 9:
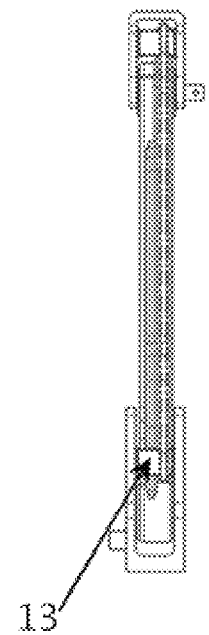
FIG. 9 is a schematic structural diagram of a rotating inner plate.

As shown in FIG. 8-9, the rotating plate includes a rotating outer plate 15 and a rotating inner plate 13 which are arranged in a superposed manner; both ends of the rotating outer plate 15 are rotatably fixed to the seat support base 11 and the fixed base 16 through a fourth rotating shaft 26 and a second rotating shaft 24, respectively. The two ends of the rotating inner plate 13 are rotatably fixed on the seat support base 11 and the fixed base 16 through the third rotating shaft 25 and the first rotating shaft 23, respectively. The first rotating shaft 23, the second rotating shaft 24, the third rotation shaft 25 and the fourth rotation shaft 26 constitute a parallelogram rotation structure. The parallelogram rotation structure is locked or unlocked by the limit shaft 14.

A limiting groove 31 is symmetrically arranged on a side plate of the seat support base 11, and the limiting axis 14 inserted into the limiting groove 31, the rotating outer plate 15 is provided with an outer plate clamping groove 30 for clamping or releasing the limiting shaft 14. The limit shaft 14 moves back and forth in the limiting groove 31 to achieve locking or unlocking; when the limit shaft 14 is locked, the outer board clamping slot 30 at this time catches the limiting shaft 14; when the limiting shaft 14 is unlocked, the outer plate clamping slot 30 releases the limiting shaft 14 at this time, and the parallelogram rotation structure forms a linkage through the bolt connection.

Figure 10:
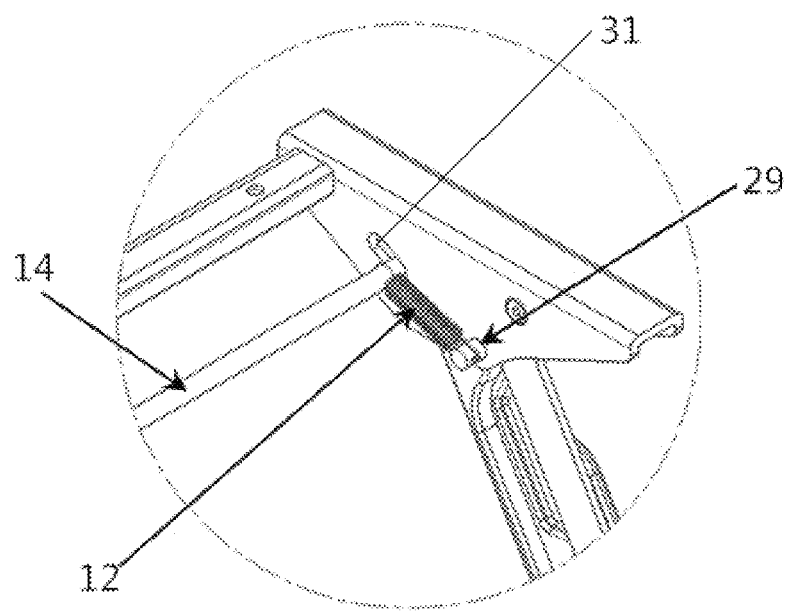
FIG. 10 is a partially enlarged structure diagram of a hook spring.

As shown in FIG. 10, one end of the hook spring 12 penetrates into the limit shaft 14, and the other end hooks into a hook spring fixing column 29 on the seat support assembly, and the seat support tube 10, the seat support base 11 and the hook spring fixing column 29 is integrated into a whole by welding Seat folding process: The fixed seat 16 is relatively fixed. The seat support tube 10 and the seat support base 11 form the entire seat support frame. The rotating inner plate 13 and the rotating outer plate 15 pass through the first rotating shaft 23, the second rotating shaft 24, the third rotating shafts 25 and the fourth rotating shaft 26 constitute a parallelogram rotation structure, and the third rotating shaft 25 and the fourth rotating shaft 26 are counter-clockwise rotations with the first rotating shaft 23 and the second rotating shaft 24 as the center of rotation, respectively. The limit shaft 14 and the seat support frame are integrally connected by a hook spring 12. An external force is applied to the limit shaft 14 and moves in the direction of the double-headed arrow at A, thereby realizing the limit function. The locking shaft 27 and the unlocking shaft 28 are the points of relative displacement of the limiting shaft 14. When the limiting shaft 14 is in the locking shaft 27, the parallelogram mechanism is fixed at this time; when the limiting shaft 14 is in the unlocking shaft 28, At this time, the parallelogram mechanism is active, so that the seat is folded.

Frame extension and contraction process: slide rail 7, slide rail fixing plate 22 constitutes the entire slide rail assembly, spring limit pin 8, slide fixing plate 9, rear frame 18, fastening plate 20, and slide block 21 constitute the entire slide assembly. The slider assembly is relatively fixed, and the slide rail assembly is relatively moved along the two-way arrows at the slide rail 7, thereby achieving the telescopic function of the frame. The slide rail assembly can move linearly between points H and I, and the spring limit pin 8 acts as a limit.

Figure 5:
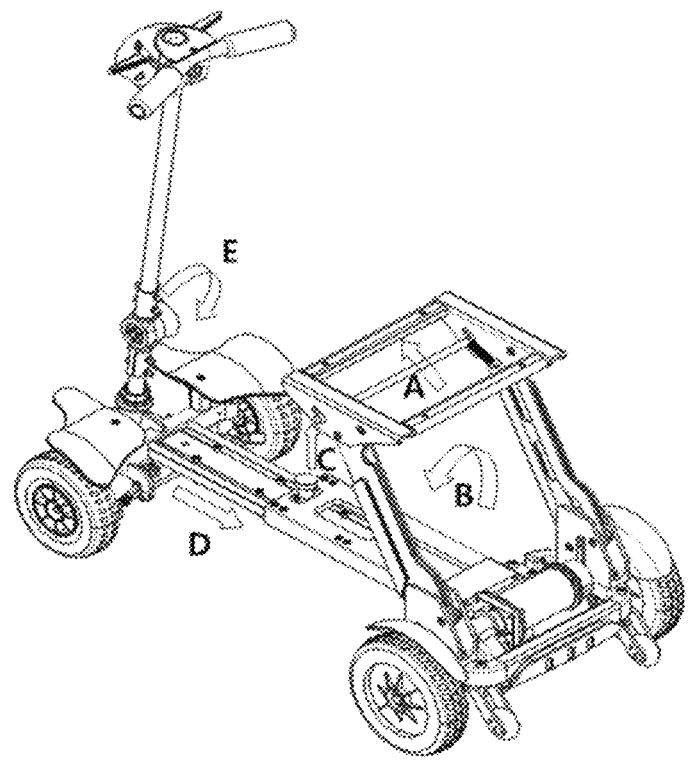
FIG. 5 is a schematic structural diagram of a folding process of a manual folding telescopic electric scooter.
Figure 6:
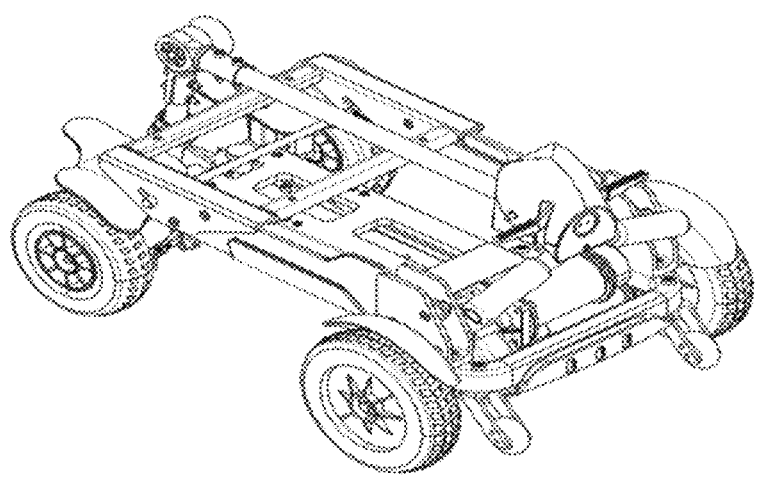
FIG. 6 is a schematic diagram of a folded structure of a manual folding telescopic electric scooter.

Vehicle folding process: As shown in FIG. 5-6, the limit shaft 14 is moved from the locked rotation shaft 27 to the unlocked rotation shaft 28, and the seat assembly is rotated counterclockwise to a horizontal state to complete the folding of the seat assembly. The spring limit pin 8 is pulled up, and the slide rail assembly is moved from the point H to the point I to complete the frame telescope. By adjusting the angle adjuster 5, direction handle assembly rotate the center of the angle adjuster 5 clockwise until it is horizontal, complete the fold of the direction handle. Follow the sequence A, B, C, D, and E shown in FIG. 5 to complete the folding of the vehicle.

The invention claimed is:

1. A manual folding telescopic electric scooter, comprising a front axle assembly, a slide rail fixing plate, a slider fixing plate, and a rear frame connected in sequence, wherein an entirety of the slide rail fixing plate slides inside the slider fixing plate to complete expansion and contraction; a fixed seat is provided symmetrically on the rear frame, and the fixed seat is respectively connected to a seat support base through a rotation plate on a corresponding side, and a seat support frame is fixed and folded by locking or unlocking the rotation plate, wherein the rotation plate comprises a rotating outer plate and a rotating inner plate which are arranged in a superposed manner; two ends of the rotating outer plate are rotatably fixed on the seat support base and the fixed seat through a fourth rotating shaft and a second rotating shaft, respectively; two ends of rotating inner plate are fixed on the seat support base and the fixed seat through a third rotating shaft and a first rotating shaft, respectively; and the first rotating shaft, the second rotating shaft, the third rotating shaft, and the fourth rotating shaft form a parallelogram rotation structure, and the parallelogram rotation structure is locked or unlocked by a limit shaft.

2. The manual folding telescopic electric scooter according to claim 1, characterized in that: a parallel slide rail is provided on the slide rail fixing plate, and set a slide block symmetrically in the slider fixing plate, the slide rail slides back and forth on the side block to complete a telescopic action of the slide rail fixing plate in the slider fixing plate, and a spring limit pin is provided on the slider fixing plate.

3. The manual folding telescopic electric scooter according to claim 1, characterized in that: a limiting groove is symmetrically arranged on a side plate of the seat support base, and a limiting axis inserted into the limiting groove, the rotating outer plate is provided with an outer plate clamping groove for clamping or releasing the limit shaft, the limit shaft moves back and forth in the limiting groove to achieve locking or unlocking; when the limit shaft is locked, an outer board clamping slot catches the limit shaft; when the limit shaft is unlocked, the outer plate clamping slot releases the limit shaft, and the parallelogram rotation structure forms a linkage through the bolt connection.

4. The manual folding telescopic electric scooter according to claim 3, characterized in that: a hook spring fixing post is symmetrically arranged on the side plate of the seat support base, and the hook spring fixing post fixes one end of the hook spring, and an other end of the hook spring penetrates into the limit shaft.

5. The manual folding telescopic electric scooter according to claim 1, characterized in that: the seat support frame further comprises a seat support tube which is symmetrically arranged, and the seat support base are connected by a seat support tube.

6. The manual folding telescopic electric scooter according to claim 1, characterized in that: the slider fixing plate is fixed to the rear frame through a fastening plate; and a motor is provided on the rear frame.

7. The manual folding telescopic electric scooter according to claim 1, characterized in that: both sides of the front axle assembly are provided with cooperative front wheels and front mud tiles; rear wheels are arranged symmetrically on both sides of the rear frame; front vertical shaft is set above the front axle assembly, and an angle adjuster and a direction handle are set on the front vertical shaft.

8. The manual folding telescopic electric scooter according to claim 7, characterized in that: the angle adjuster comprises an adjusting knob, a lower adjuster, and an upper adjuster, an adjusting nut; the lower adjuster meshes with the upper adjuster through a tooth-shaped protrusion, and the adjusting knob and the adjusting nut are screwed tightly through a thread fit, a gap between the lower adjuster and the upper adjuster is controlled by turning an adjustment knob clockwise or counterclockwise, and when the adjustment knob is rotated counterclockwise, the upper adjuster is free to rotate to adjust an angle of the direction handle.

\* \* \* \* \*